(12) United States Patent
Opferkuch et al.

(10) Patent No.: US 8,561,451 B2
(45) Date of Patent: Oct. 22, 2013

(54) TUBES AND METHOD AND APPARATUS FOR PRODUCING TUBES

(75) Inventors: Frank Opferkuch, Unterensingen (DE); Daniel Borst, Wolfschlugen (DE); Martin Ploppa, Pfullingen (DE); Werner Zobel, Böblingen (DE); Jens Nies, Holzgerlingen (DE); Andreas Stolz, Waldorfhäslach (DE); Dieter Merz, Dotternhousen (DE); Siegfried Eisele, Schönaich (DE)

(73) Assignee: Modine Manufacturing Company, Racine, WI (US)

( * ) Notice: Subject to any disclaimer, the term of this patent is extended or adjusted under 35 U.S.C. 154(b) by 516 days.

(21) Appl. No.: 12/534,654

(22) Filed: Aug. 3, 2009

(65) Prior Publication Data
US 2010/0024508 A1 Feb. 4, 2010

Related U.S. Application Data

(63) Continuation of application No. PCT/EP2008/000288, filed on Jan. 16, 2008.

(30) Foreign Application Priority Data

Feb. 1, 2007 (DE) .................. 10 2007 004 993

(51) Int. Cl.
*B21D 13/00* (2006.01)
*B21D 21/00* (2006.01)

(52) U.S. Cl.
USPC .................. 72/379.6; 72/385; 29/890.053

(58) Field of Classification Search
USPC ............. 72/367.1, 379.6, 129, 187, 196–198, 72/203, 385; 29/890.03, 890.049, 890.053
See application file for complete search history.

(56) References Cited

U.S. PATENT DOCUMENTS

| 1,242,652 A | 9/1917 | Capell |
| 1,599,395 A | 9/1926 | Hards |

(Continued)

FOREIGN PATENT DOCUMENTS

| CN | 101600523 | 12/2009 |
| DE | 273441 | 7/1912 |

(Continued)

OTHER PUBLICATIONS

First Office Action from State Intellectual Property Office of the People's Republic of China for Application No. 200880003890.4 dated Aug. 4, 2010 (8 pages).

(Continued)

*Primary Examiner* — Teresa M Ekiert
(74) *Attorney, Agent, or Firm* — Michael Best & Friedrich LLP

(57) ABSTRACT

A system and method for producing flat tubes is described and illustrated. The flat tubes can be produced from at least one strip of endless band material having at least one wall part and an inner part formed with corrugations on a roller train provided with roller pairs, with the strip running in a longitudinal direction through the rollers and being shaped. The inner part of the flat tube can be formed with corrugations placed between the shaped wall parts, after which the closure of the flat tube is carried out. Production of the flat tubes can include forming spaced apart band thinning lines running in the longitudinal direction of the strip, and forming corrugation peaks and corrugation troughs at the band thinning lines.

13 Claims, 9 Drawing Sheets

(56) References Cited

U.S. PATENT DOCUMENTS

| | | | |
|---|---|---|---|
| 2,222,842 A | 11/1940 | Humphrey | |
| 2,252,210 A | 8/1941 | Seemiller | |
| 2,373,218 A | 4/1945 | Arnold | |
| 2,444,463 A | 7/1948 | Nordquist | |
| 2,757,628 A | 8/1956 | Johnston | |
| 2,912,749 A | 11/1959 | Bauernfeind et al. | |
| 3,021,804 A * | 2/1962 | Simpelaar | 29/890.046 |
| 3,053,511 A | 9/1962 | Godfrey | |
| 3,229,760 A | 1/1966 | Hurter et al. | |
| 3,233,443 A | 2/1966 | Lawson | |
| 3,508,607 A | 4/1970 | Herrmann | |
| 3,640,340 A | 2/1972 | Leonard et al. | |
| 3,687,193 A | 8/1972 | Wright | |
| 3,695,347 A * | 10/1972 | Chartet | 29/890.045 |
| 3,698,222 A * | 10/1972 | Blake | 72/129 |
| 3,719,227 A | 3/1973 | Jenssen | |
| 3,730,411 A | 5/1973 | Brockmuller | |
| 3,734,135 A | 5/1973 | Mosier | |
| 3,777,530 A * | 12/1973 | Jansson | 72/129 |
| 3,928,105 A * | 12/1975 | Holden | 156/200 |
| 4,043,388 A | 8/1977 | Zebuhr | |
| 4,197,625 A | 4/1980 | Jahoda | |
| 4,215,744 A | 8/1980 | Bowles | |
| 4,470,452 A | 9/1984 | Rhodes | |
| 4,501,321 A | 2/1985 | Real et al. | |
| 4,570,700 A | 2/1986 | Ohara et al. | |
| 4,805,693 A | 2/1989 | Flessate | |
| 4,901,908 A | 2/1990 | Negura et al. | |
| 4,949,543 A | 8/1990 | Cottone et al. | |
| 5,036,909 A | 8/1991 | Whitehead et al. | |
| 5,058,266 A | 10/1991 | Knoll | |
| 5,179,770 A | 1/1993 | Block et al. | |
| 5,185,925 A | 2/1993 | Ryan et al. | |
| 5,186,250 A | 2/1993 | Ouchi et al. | |
| 5,224,538 A | 7/1993 | Jacoby | |
| 5,249,345 A | 10/1993 | Virsik et al. | |
| 5,350,098 A | 9/1994 | Oakley et al. | |
| 5,351,750 A | 10/1994 | Garcia | |
| 5,386,629 A | 2/1995 | Ouchi et al. | |
| 5,441,106 A * | 8/1995 | Yukitake | 29/890.049 |
| 5,456,006 A * | 10/1995 | Study | 29/890.049 |
| 5,457,885 A | 10/1995 | Ohashi et al. | |
| 5,692,300 A | 12/1997 | Conn et al. | |
| 5,697,433 A | 12/1997 | Kato | |
| 5,799,727 A | 9/1998 | Liu | |
| 6,061,905 A | 5/2000 | Logic | |
| 6,119,341 A | 9/2000 | Kato et al. | |
| 6,192,977 B1 | 2/2001 | Dey et al. | |
| 6,195,874 B1 | 3/2001 | Chen et al. | |
| 6,206,262 B1 | 3/2001 | Achelpohl et al. | |
| 6,209,202 B1 | 4/2001 | Rhodes et al. | |
| 6,261,706 B1 | 7/2001 | Fukuda et al. | |
| 6,286,201 B1 | 9/2001 | Prater et al. | |
| 6,308,775 B1 | 10/2001 | Naumann | |
| 6,425,261 B2 | 7/2002 | Burk et al. | |
| 6,467,170 B2 | 10/2002 | Kato et al. | |
| 6,470,570 B2 | 10/2002 | Prater et al. | |
| 6,475,301 B1 | 11/2002 | Grab et al. | |
| 6,502,305 B2 | 1/2003 | Martins et al. | |
| 6,510,870 B1 | 1/2003 | Valaszkai et al. | |
| 6,513,586 B1 | 2/2003 | Haussmann | |
| 6,527,045 B1 | 3/2003 | Osakabe et al. | |
| 6,537,388 B1 | 3/2003 | Wynns et al. | |
| 6,546,774 B2 | 4/2003 | Granetzke | |
| 6,640,886 B2 | 11/2003 | Lamich | |
| 6,640,887 B2 | 11/2003 | Abell et al. | |
| 6,666,265 B1 | 12/2003 | Kato et al. | |
| 6,681,597 B1 | 1/2004 | Yin | |
| 6,732,434 B2 | 5/2004 | Luo et al. | |
| 6,822,166 B2 * | 11/2004 | James et al. | 174/93 |
| 6,988,539 B2 | 1/2006 | Kato et al. | |
| 7,107,680 B2 | 9/2006 | Ueda | |
| 7,117,936 B2 | 10/2006 | Ohata et al. | |
| 7,135,239 B2 | 11/2006 | Rajagopalan | |
| 7,152,671 B2 | 12/2006 | Shibagaki et al. | |
| 7,204,302 B2 | 4/2007 | Shibagaki et al. | |
| 7,290,595 B2 | 11/2007 | Morishita et al. | |
| 7,461,689 B2 | 12/2008 | Merklein et al. | |
| 7,487,589 B2 | 2/2009 | Smith et al. | |
| 7,665,512 B2 | 2/2010 | Brost et al. | |
| 2002/0179297 A1 | 12/2002 | Kato et al. | |
| 2004/0007040 A1 | 1/2004 | Ibron et al. | |
| 2004/0035910 A1 | 2/2004 | Dockus et al. | |
| 2004/0108305 A1 | 6/2004 | Harnisch et al. | |
| 2004/0194943 A1 | 10/2004 | Yamauchi | |
| 2004/0206482 A1 | 10/2004 | Bang | |
| 2005/0006082 A1 | 1/2005 | Brost et al. | |
| 2005/0077033 A1 | 4/2005 | Schmalzried | |
| 2005/0085363 A1 | 4/2005 | Helms et al. | |
| 2005/0092476 A1 | 5/2005 | Hu et al. | |
| 2005/0133210 A1 | 6/2005 | Inagaki et al. | |
| 2005/0247444 A1 | 11/2005 | Ohata et al. | |
| 2006/0086491 A1 | 4/2006 | Ueda | |
| 2006/0230617 A1 | 10/2006 | Kent et al. | |
| 2006/0243429 A1 | 11/2006 | Chu et al. | |
| 2006/0265874 A1 | 11/2006 | Hashimoto et al. | |
| 2007/0095514 A1 | 5/2007 | Inoue et al. | |
| 2007/0119581 A1 | 5/2007 | Kato | |
| 2007/0144722 A1 | 6/2007 | Matsuzaki et al. | |
| 2009/0014164 A1 | 1/2009 | Zobel et al. | |
| 2009/0014165 A1 | 1/2009 | Zobel et al. | |
| 2009/0019689 A1 | 1/2009 | Zobel et al. | |
| 2009/0019694 A1 | 1/2009 | Zobel et al. | |
| 2009/0019695 A1 | 1/2009 | Zobel et al. | |
| 2009/0019696 A1 | 1/2009 | Zobel et al. | |
| 2009/0020277 A1 | 1/2009 | Zobel et al. | |
| 2009/0020278 A1 | 1/2009 | Zobel et al. | |
| 2009/0056927 A1 | 3/2009 | Zobel et al. | |
| 2009/0139703 A1 | 6/2009 | Vet et al. | |
| 2009/0218085 A1 | 9/2009 | Rogers et al. | |
| 2009/0260794 A1 | 10/2009 | Minami et al. | |
| 2010/0243225 A1 | 9/2010 | Zobel et al. | |
| 2011/0302782 A1 | 12/2011 | Schmid et al. | |

FOREIGN PATENT DOCUMENTS

| | | |
|---|---|---|
| DE | 401893 | 9/1924 |
| DE | 934644 | 11/1955 |
| DE | 935487 | 11/1955 |
| DE | 2113581 | 12/1972 |
| DE | 2408462 | 8/1975 |
| DE | 3416840 | 11/1985 |
| DE | 3809944 | 10/1989 |
| DE | 4031577 | 4/1992 |
| DE | 4340378 | 6/1994 |
| DE | 29614186 | 12/1997 |
| DE | 19641144 | 4/1998 |
| DE | 19800096 | 7/1998 |
| DE | 19753724 | 6/1999 |
| DE | 10137334 | 2/2003 |
| DE | 10200586 | 7/2003 |
| DE | 102004057407 | 8/2005 |
| DE | 102005050366 | 4/2006 |
| DE | 102006006670 | 8/2007 |
| DE | 102006029378 | 1/2008 |
| EP | 0179646 | 4/1986 |
| EP | 0765701 | 4/1997 |
| EP | 0859209 | 8/1998 |
| EP | 0907062 | 4/1999 |
| EP | 1128148 | 8/2001 |
| EP | 1455154 | 9/2004 |
| EP | 1640684 | 3/2006 |
| EP | 1684041 | 7/2006 |
| FR | 2690233 | 10/1993 |
| FR | 2811746 | 1/2002 |
| GB | 444964 | 3/1936 |
| GB | 683161 | 11/1952 |
| GB | 2190481 | 11/1987 |
| GB | 2203677 | 10/1988 |
| GB | 2321101 | 7/1998 |
| GB | 2354960 | 4/2001 |
| GB | 2426727 | 12/2006 |
| JP | 5749793 | 3/1982 |
| JP | 57105690 | 7/1982 |

(56) References Cited

FOREIGN PATENT DOCUMENTS

| | | |
|---|---|---|
| JP | 58000094 | 1/1983 |
| JP | 60247426 | 12/1985 |
| JP | 7019779 | 1/1995 |
| JP | 9273883 | 10/1997 |
| JP | 10160375 | 6/1998 |
| JP | 11104768 | 4/1999 |
| JP | 11351777 | 12/1999 |
| JP | 2001050677 | 2/2001 |
| JP | 2002350083 | 12/2002 |
| JP | 2003336989 | 11/2003 |
| JP | 2004092940 | 3/2004 |
| JP | 2005214511 | 8/2005 |
| JP | 2006064345 | 3/2006 |
| RU | 2032878 | 4/1995 |
| SU | 340209 | 1/1972 |
| SU | 616521 | 7/1978 |
| WO | 8203574 | 10/1982 |
| WO | 8303784 | 11/1983 |
| WO | 95/30867 | 11/1995 |
| WO | 2004/080640 | 9/2004 |
| WO | 2006/116857 | 11/2006 |
| WO | 2008011115 | 1/2008 |
| WO | 2008092563 | 8/2008 |

OTHER PUBLICATIONS

PCT/EP2008/000288 International Preliminary Report on Patentability dated Oct. 6, 2009 (7 pages).
PCT/EP2008/000288 International Search Report dated Jul. 11, 2008 (4 pages).
Second Office Action from the State Intellectual Property Office of China for Application No. 200880003890.4 dated May 25, 2011 (English Translation—5 pages).
EP 10008153 European Search Report dated Sep. 23, 2010 (5 pages).
DE 102007004993.7 German Search Report dated Feb. 1, 2007 ( 2 pages).

* cited by examiner

TUBES AND METHOD AND APPARATUS FOR PRODUCING TUBES

CROSS-REFERENCE TO RELATED APPLICATIONS

This is a continuation application of and claims priority to PCT Application No. PCT/EP2008/000288 filed on Jan. 16, 2008. Priority is also claimed to German Patent App. No. 10 2007 004 993.7 filed on Feb. 1, 2007. The entire contents of both prior-filed patent applications are incorporated herein by reference.

BACKGROUND

The present invention relates to a production method for producing flat tubes from at least one strip of endless band material having at least one wall part and having an inner part which is formed with corrugations on a roller train provided with roller pairs, with the strip running in the longitudinal direction through the rollers and being shaped, and with the inner part formed with corrugations being placed between the shaped wall part, after which closure of the flat tube is carried out. The present invention also relates to a roller train on which the method is carried out, and to a heat exchanger having the produced flat tubes.

The method steps stated above can be gathered from earlier-filed German patent application no. DE 10 2006 029 378.9. With reference to this document, required for producing flat tubes is a roller train which, for example depending on the desired geometry of the inner part or of the "endless" strip from which the inner part is generated, could extend over more than 10-20 m, requires considerable investment capital. The substantive matter is indicated in FIG. 16 of German patent application no. DE 10 2006 029 378.9, which is present as FIG. 22 of this application. As FIG. 15 of German patent application no. DE 10 2006 029 378.9 shows, during the course of the production of the corrugations 70 of the inner part, the width of the strip is correspondingly reduced and the number of corrugations 70 is increased, which influences inter alia the installation expenditure of the roller train because numerous roller pairs 60 are required.

FIG. 5 in DE 198 00 096 A1 likewise shows a plurality of roller pairs. Also described in DE 198 00 096 A1 is the production of corrugated plates.

SUMMARY

An object of some embodiments of the present invention is simplification of production of flat tubes, and the corresponding reduction of expenditures of investment capital.

In some embodiments, the production method is carried out on a roller train having at least one section for shaping at least one endless strip, a section for joining the strip to form a tube, and a separating station for tubes, with said roller train being further developed such that the roller train has at least one roller pair which can be used to produce band thinning lines which run in the longitudinal direction of the strip. The roller train can also have at least one roller pair with which corrugation peaks and corrugation troughs are formed which are situated in the band thinning lines.

In some production method embodiments, band thinning lines are formed which run in the longitudinal direction of the strip and are arranged with a spacing, and corrugation peaks and corrugation troughs situated in the band thinning lines are subsequently produced. As a result of the band thinning lines, the subsequent formation of the corrugations can be more easily facilitated, because the corrugation troughs and corrugation peaks can be formed more easily (i.e., with less force expenditure). The band thinning lines can effectively pre-define where the strip should bend in order to generate the corrugation peaks and the corrugation troughs. The depth of the band thinning lines can be, for example, about 50% of the thickness of the strip.

Also in some embodiments, before or after the formation of the band thinning lines, turbulators extending between the band thinning lines perpendicularly or obliquely relative thereto can be formed and/or raised out of the plane of the strip. This can improve the heat transfer between a medium flowing in the interior of the flat tubes and a medium flowing externally around the flat tube. The turbulators can defined by known serrations folded out of the plane of the strip, or can be of any other desired design meeting the purpose. As used herein and in the appended claims, the term "turbulator" encompasses designs which are composed merely of holes between the band thinning lines, in strips, without material being raised out of the plane of the strip.

The band thinning lines can, in some embodiments, be formed in parallel lines.

In some embodiments, the band thinning lines can be formed alternately on the upper side and on the lower side of the strip. Depending at least in part upon the geometry of the corrugations of the inner insert, however, two band thinning lines provided on the upper side can for example be followed by two band thinning lines provided on the underside. The spacing between said two band thinning lines, which thus in each case form a pair, can be smaller than the spacing to the next pair of band thinning lines.

Alternatively, however, the band thinning lines can all be formed on one side of the strip.

With regard to installation expenditure, in some embodiments it is advantageous for all of the band thinning lines to be formed by means of a single roller pair.

In some embodiments, the corrugation peaks and the corrugation troughs are formed by roller pairs through which the strip runs in its longitudinal direction. The corrugation running direction is transverse with respect to the longitudinal direction of the strip.

The wall part of the flat tube and the inner part which is formed with corrugations can be parts of a single strip. Alternatively, in some embodiments, the inner part is composed of a first strip, and the wall part of the tube can be produced from a second strip or from second and third strips.

Using the manner of production and the production apparatus described herein, a flat tube can be produced using a plate thicknesses in the range of 0.03-0.15 mm. Heat exchangers equipped with such flat tubes meet the demands made of them in the field of motor vehicles, among other fields.

In some embodiments, both narrow sides of the flat tube produced according to the present invention are reinforced, wherein the thickness of the strip of the flat tube is 0.25 mm or less. In those embodiments in which tubes are constructed from two or more strips (e.g., three-strips), the strips can be of the same thickness. Alternatively, the strips which form the wall can have a thickness of less than about 0.25 mm (e.g., about 0.12 mm), and the thickness of the third strip can be, for example, less than about 0.10 mm.

The thickness of each of the strips in a two- or three-strip tube can also be in the range of 0.03 mm-0.15 mm in order to provide a cost-effective heat exchanger with good heat transfer properties.

The inner part (e.g., tube insert) can be provided with corrugations which run in the transverse direction of the flat tube and form ducts which run in the longitudinal direction of the flat tube. Straight corrugations of this type can be extremely cost-effective and simple to produce. The corrugations can be formed in such a way that the corrugation flanks stand approximately perpendicular on the wide sides or have only a small angle of inclination.

In some embodiments, the small diameter d of the flat tube is in the range of about 0.7 mm to 1.5 mm in, for example, applications of the flat tubes in a coolant cooler. In charge air coolers, for example, the small diameter d can also be greater than 10.0 mm. The large diameter D can be freely determined within wide ranges by using a correspondingly wide starting strip of material. Also, in some embodiments, the rollers used to produce the tubes can be adjusted to produce wider or narrower flat tubes. However, in some embodiments it is preferable for roller sets generating preferred tube dimensions to be completely exchanged. Flat tubes produced according to various embodiments of the present invention can permit cost-effective production of heat exchangers with relatively wide (deeper) or relatively narrow cooling meshes using only a single roller train.

BRIEF DESCRIPTION OF THE DRAWINGS

The present invention is now briefly described in various exemplary embodiments with reference to the accompanying drawings. The description of the exemplary embodiments can highlight further essential features and advantages of the present invention.

DETAILED DESCRIPTION

Figure 1:
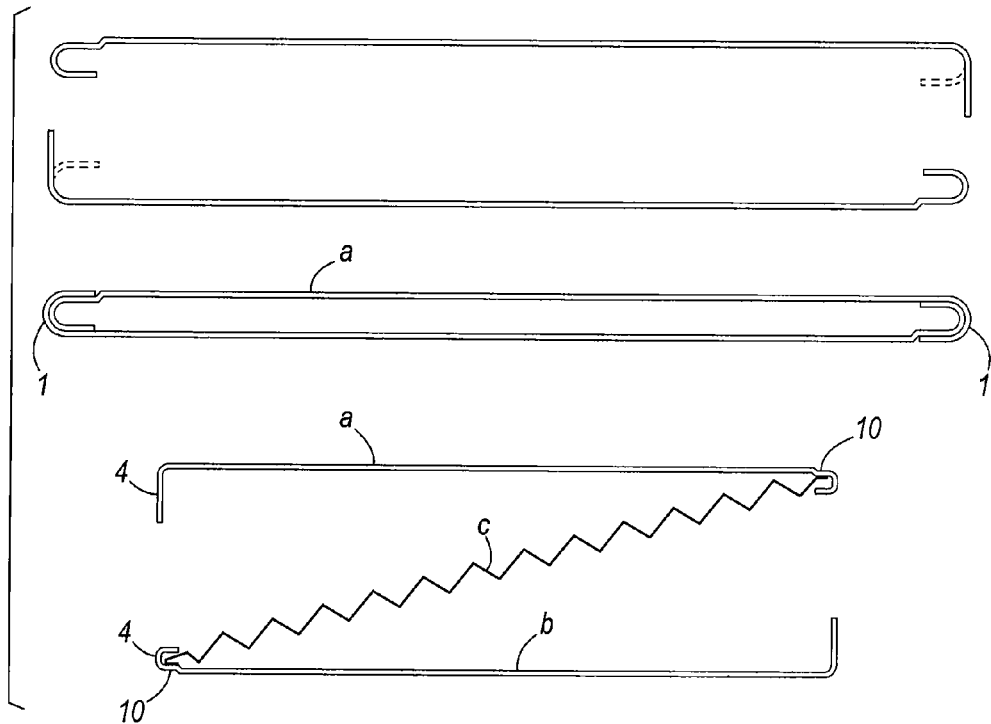
FIG. 1 shows a flat tube in which an inner part is inserted, according to an embodiment of the present invention.
Figure 2:
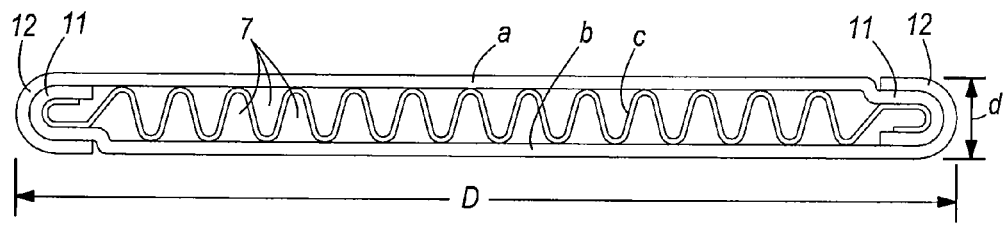
FIG. 2 shows a fully-produced flat tube in cross section, according to an embodiment of the present invention.

Strips a and b of a flat tube according to an embodiment of the present invention are shown in FIGS. 1 and 2, and are of identical design. The strips a and b have been arranged with their longitudinal edges 4 laterally reversed relative to one another. In other words, one longitudinal edge 4 of each strip a and b is provided with a step 10 which is joined to a smaller curved portion 11 running in the narrow side 1 of the tube, whereas the other longitudinal edge is provided merely with a larger curve 12 (without a step 10) which forms the other narrow side 1 of the tube and is suitable for holding within it the smaller curve 11 of the other strip b or a of the flat tube. In FIG. 1, a strip a or b has been shown in a state in which the large curve 12 has not been fully produced. The term "curve" is not intended to only reference a semicircle, and instead means any suitable geometry which can meet the purpose of receiving or being received within the formed longitudinal edge of an adjacent strip as described above in a nested relationship.

The corrugation flanks which connect the corrugation peaks Wb and the corrugation troughs Wt are arranged so as to be only slightly inclined. Both longitudinal edges of the inner part c are shaped as per FIG. 2 in such a way as to bear internally against the narrow sides 1 of the flat tube, and thereby reinforce the two narrow sides 1. The thickness of each narrow side 1 therefore corresponds, in the exemplary embodiment as per FIG. 2, to the sum of the thickness of the three strips a, b, c. In some embodiments, the three strips a, b, c each have the same thickness. The thickness dimension of each of the three strips a, b, c can be in the range from about 0.03 mm to about 0.15 mm. Also, the strips a, b which form the wall of the tube preferably have a thickness dimension of between about 0.10 mm-and about 0.25 mm, whereas the thickness dimension of the third strip c can be between about 0.03-and about 0.10 mm. Despite these small sheet thicknesses, both narrow sides 1 of the flat tube have a relatively good degree of stability.

The corrugations of the inner part c run in the transverse direction of the flat tube, and form ducts 7 which run in the longitudinal direction of the flat tube. The ducts 7 can be formed as discrete ducts 7 (i.e., closed to adjacent ducts 7) or as open flow ducts 7 (i.e., at least partially open to adjacent ducts 7). The hydraulic diameter of the ducts 7 can be selected by means of a corresponding design of the corrugations. The hydraulic diameter is relatively small if one considers that the small diameter d of the flat tubes can be approximately 0.8 mm, and that the number of corrugations is relatively high.

At least some of the strips a, b, c can have an expedient braze coating provided to connect the strips a, b, c of the flat tube and the entire cooling circuit of the heat exchanger by means of a brazing process (not shown). In the illustrated embodiment, the strips a, b, c of the flat tube are composed of sheet aluminum provided as an endless band material.

Further details can be gathered from German patent application number DE 10 2006 006 670.7, the entire contents of which are incorporated herein by reference.

Figure 3:
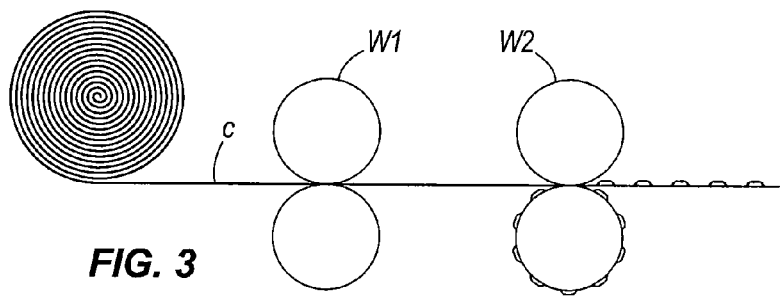
FIGS. 3 and 4 show a simplified detail of a roller train according to an embodiment of the present invention.
Figure 6:
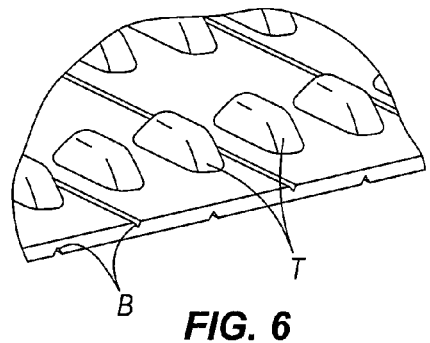
Figure 7:
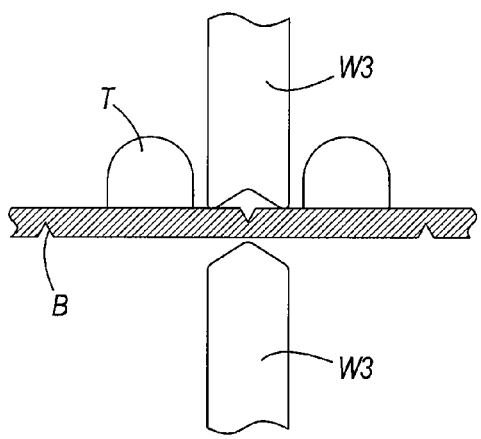
Figure 21:
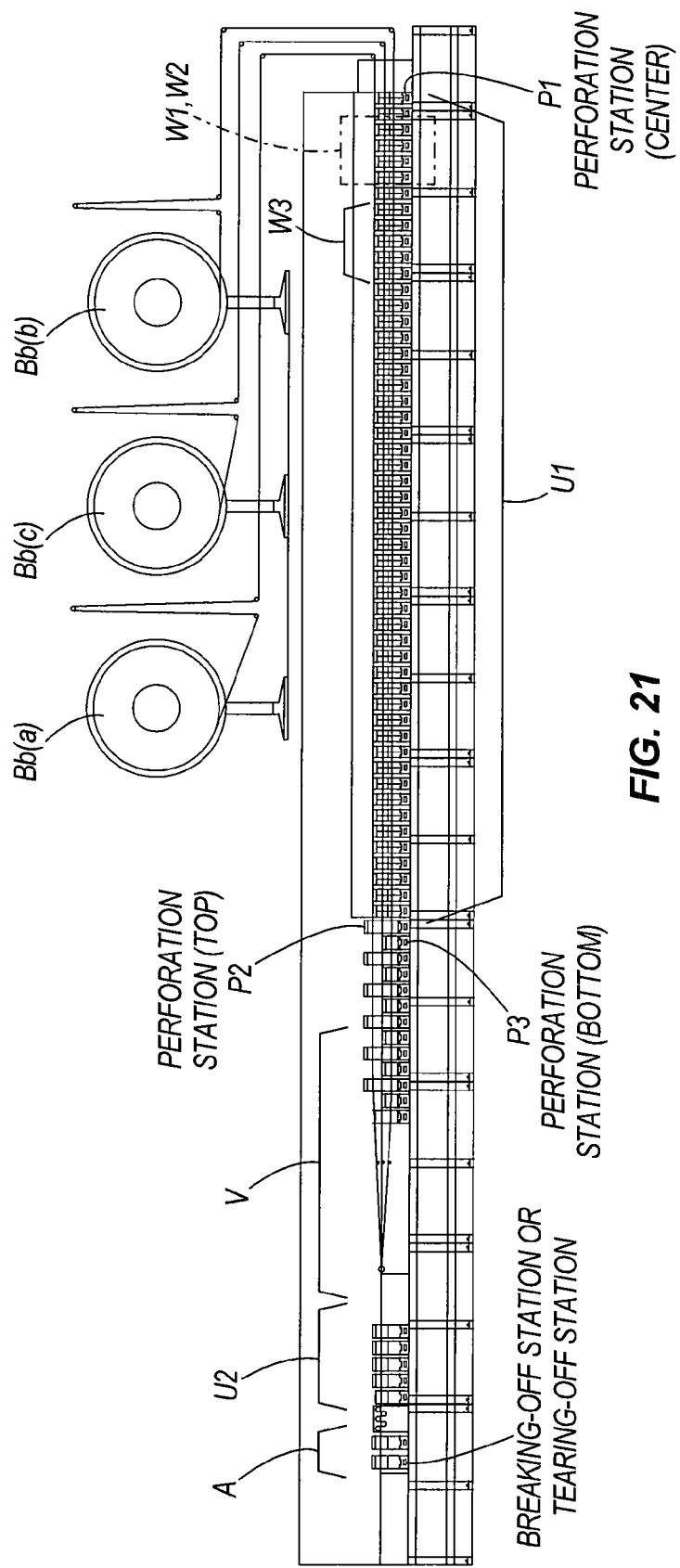
FIG. 21 diagrammatically shows a roller train according to an embodiment of the present invention.
Figure 22:
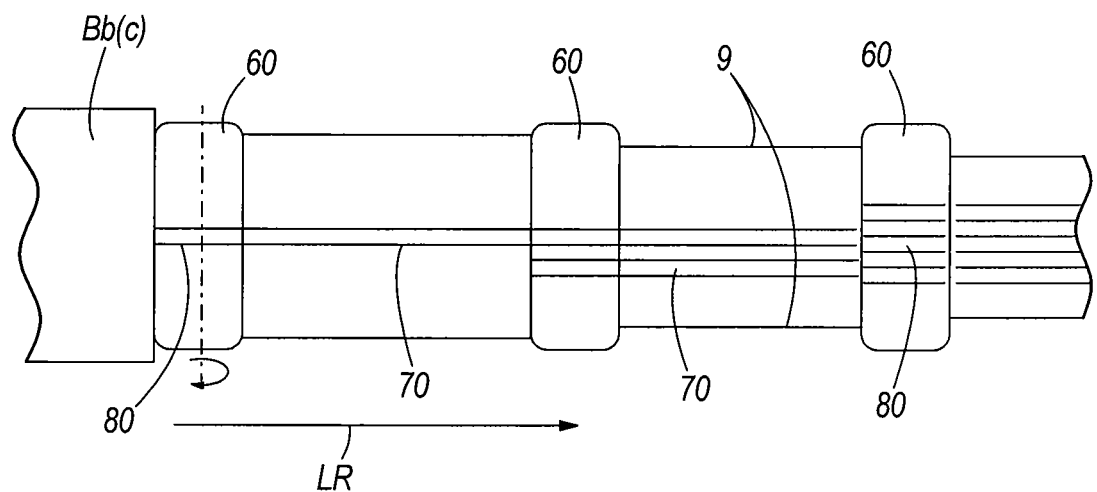
FIG. 22 shows a prior production process.

As the exemplary embodiment in FIG. 21 shows, and as already mentioned, three sheet metal bands Bb (coils) and three strips a, b, c are used to produce tubes according to some embodiments of the present invention. One sheet metal band Bb serves for the production of one wall part a, whereas another sheet metal band serves for the production of the second wall part b, and a third and widest sheet metal band Bb (in the center in FIG. 21) serves for the production of the inner part c. The unreeling sheet metal bands Bb in the illustrated embodiment run initially over rolling devices which permit a certain buffering of band material. Band loops which serve this purpose can be seen in FIG. 21. Also with reference to the illustrated embodiment, the production of the flat tube begins with the production or with the shaping of the inner part c. Situated quite close to the start of the roller train is at least one roller pair W1 which can be used to form band thinning lines B in the still-planar strips c in the longitudinal direction LR thereof, as shown in more detail in FIGS. 3 and 4. These lines B are embossed by means of a roller pair W1. In the exemplary embodiment, the roller pair W1 is of such a width that all the band thinning lines B can be produced with the one roller pair W1. Also shown, in particular in FIGS. 5, 6 and 7 is that, in some embodiments, the band thinning lines B are formed alternately on the upper side and on the lower side of the strip c. Spaced-apart individual lines B can thereby be provided. The lines B can also be arranged in pairs (see B1 and B2 of FIG. 18). It is also possible to form all of the band thinning lines B on one side of the strip c.

Figure 4:
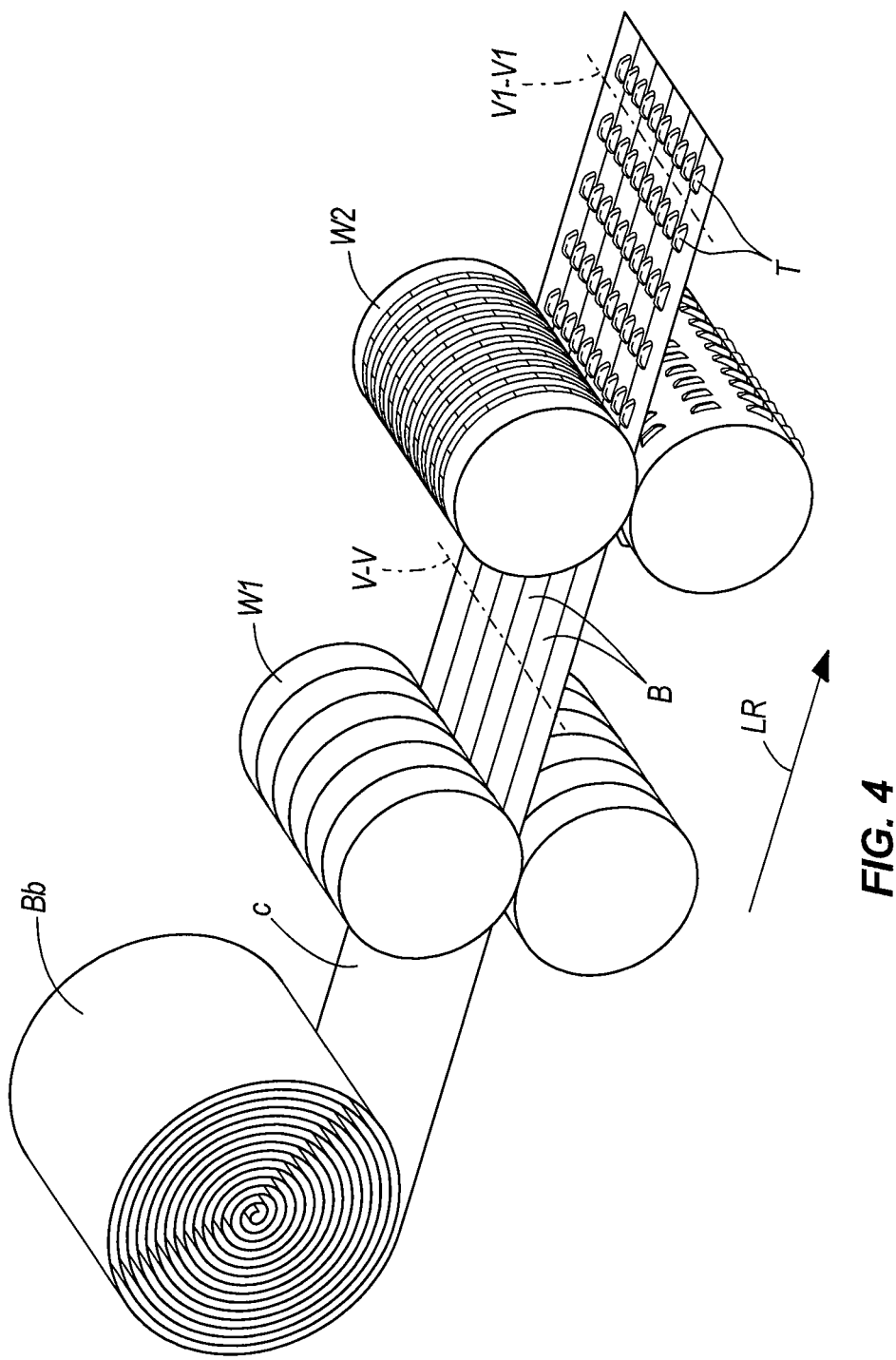
Figure 5:
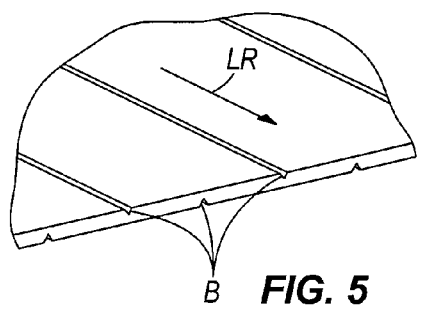
FIGS. 5-9 show shaping stages which take place on a strip in the course of a production method according to an embodiment of the present invention, wherein each shaping extends transversely with respect to the longitudinal direction LR of said strip.

FIG. 5 illustrates a strip c after leaving the roller pair W1 at the line V-V in FIG. 4. FIG. 6 next shows the strip c at the line VI-VI in FIG. 4, after leaving the next roller pair W2, by which turbulators T have been formed between the band thinning lines B.

FIGS. 10-16 show different turbulators T arranged between band thinning lines B. The turbulators T can be bulged portions 21 or cuts 20 folded out of plane of the strip c. The turbulators T can be formed in the still-planar band, wherein it should be pointed out that the formation of the corrugations takes place thereafter.

Figure 8:
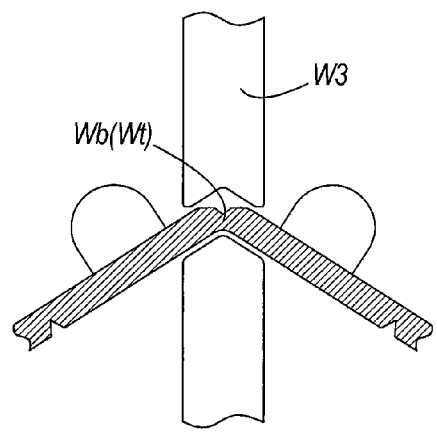
Figure 9:
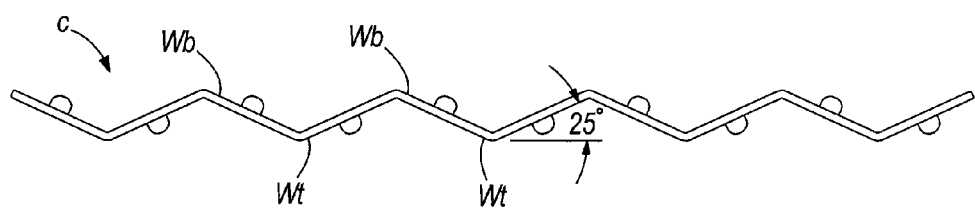
Figure 10:
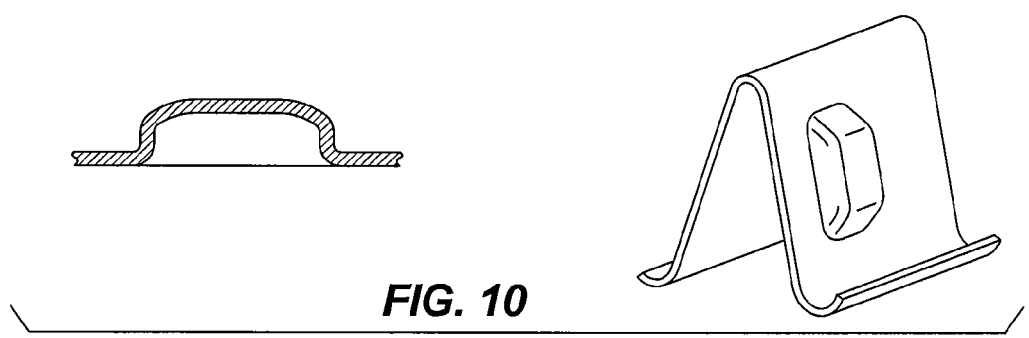
FIGS. 10-16 show a corrugated strip with different turbulators according to various embodiments of the present invention.
Figure 11:
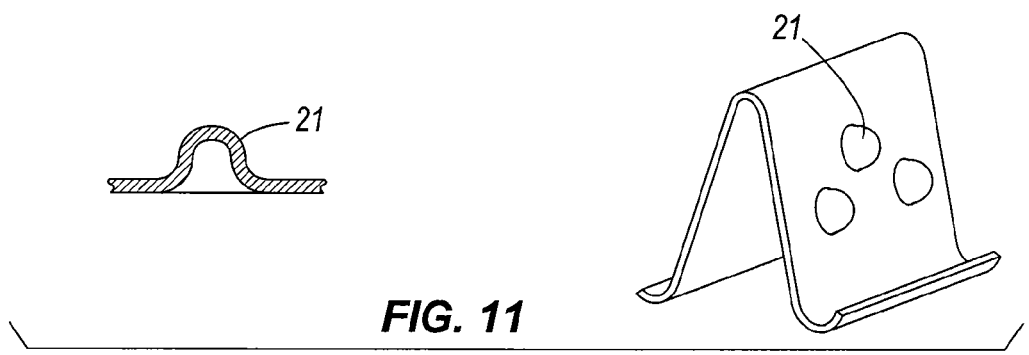
Figure 12:
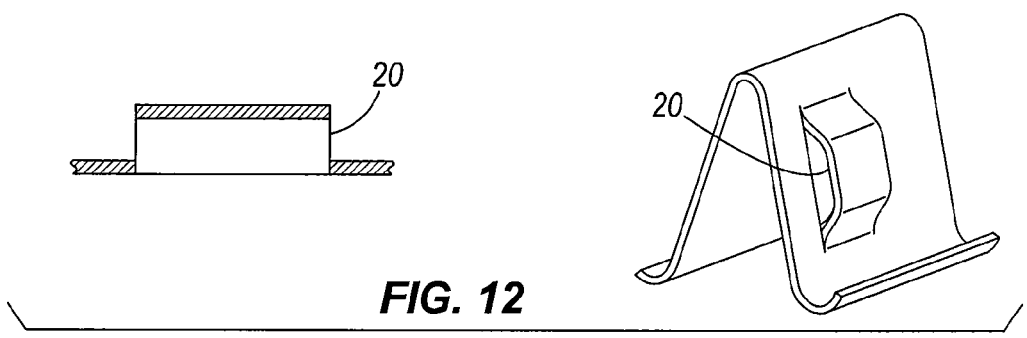
Figure 13:
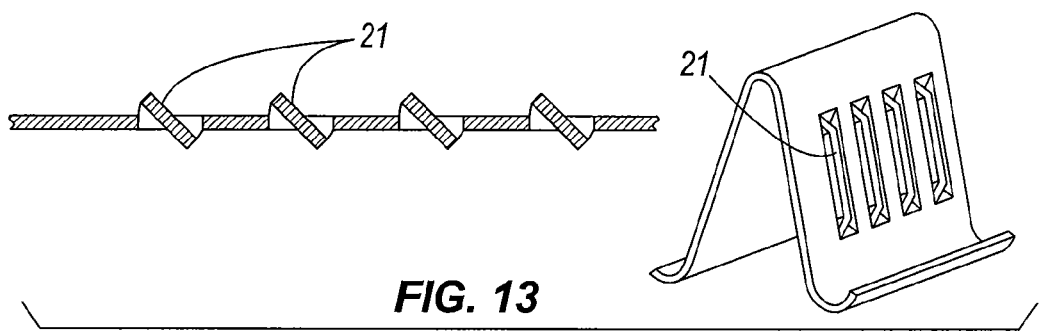
Figure 14:
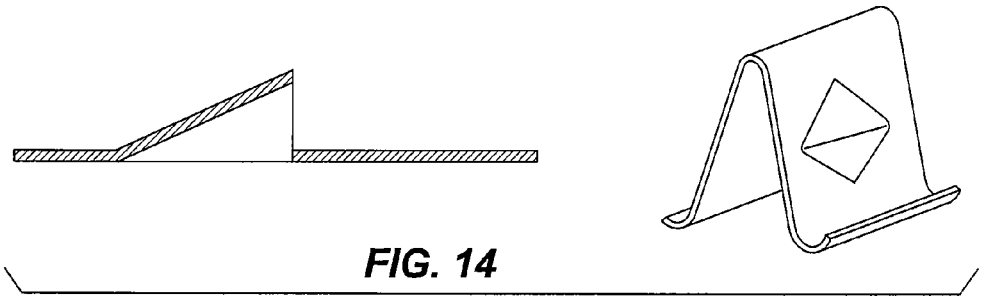
Figure 15:
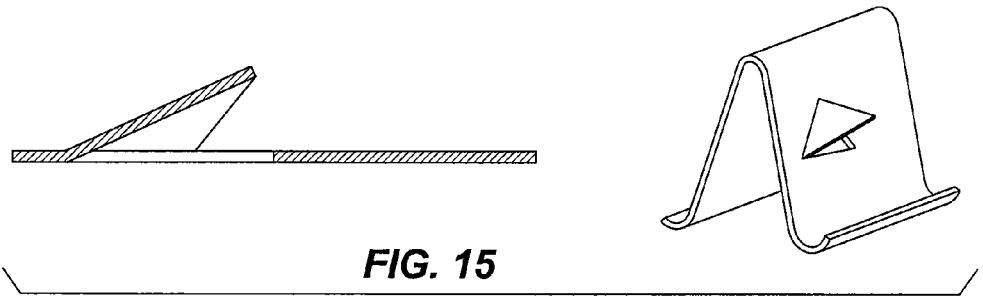
Figure 16:
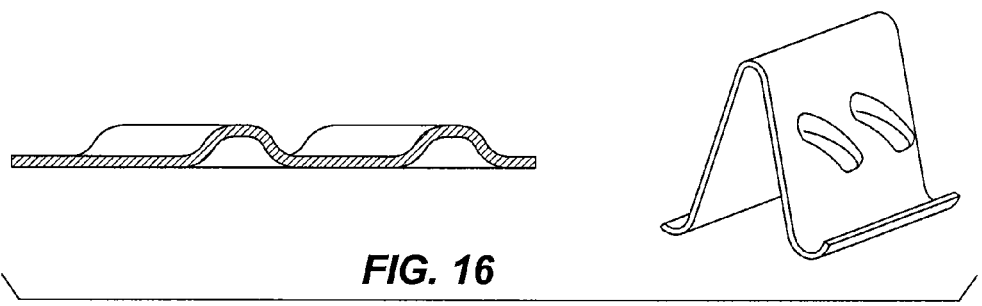

Returning to FIG. 21, it can also be seen that the roller pairs W1 and W2 are part of a first shaping section U1 of the roller train. When the strip c has left the roller pair W2, the formation of the corrugation peaks Wb and of the corrugation troughs Wt begins, this being carried out with the aid of further roller pairs W3 which are also indicated in FIGS. 7 and 8. As FIGS. 7 and 8 show, a corrugation peak Wb or a corrugation trough Wt can be formed in each band thinning line B. FIG. 9 shows the inner part c in an approximately half-finished state, which can however also be a finished state depending on which physical corrugation geometry is provided for a desired application. In FIG. 9, corrugation peaks Wb and corrugation troughs Wt have already been formed.

With continued reference to FIG. 21, the shaping of the edges 4 of the wall parts of the flat tube or of the strips a and b can also begin in the above-mentioned first shaping section U1 of the roller train, which is not shown in detail in FIG. 21, but can be understood with regard to the third illustration from the top of FIG. 1. Shown in FIG. 1 is a state as is approximately present when the strips a, b and c are in the joining section V, that is to say when they have already left the first shaping section U1, which has also been specified in FIG. 21 by reference symbol V. Once the strips a, b, c have been joined to one another, the flat tube is closed in a second shaping section U2 (see FIG. 21), so that a tube geometry is finally present as is shown for example in FIG. 2. Individual tubes can then be trimmed (cut to a desired length), for which purpose the roller train can have the separating station A. The separation can be facilitated or improved qualitatively if the strips a, b, c are previously perforated or provided with intended breaking points at corresponding locations, for which purpose the roller train can be equipped with perforation stations P1, P2 and P3. In the illustrated joining section V, it is ensured that the intended breaking points in the individual strips a, b, c are positioned at the same level (i.e., longitudinal position) in the fully-shaped tube. The intended breaking points can also or instead be band thinning lines which, in contrast to the band thinning lines B described above, are arranged transversely with respect to the longitudinal direction LR (not shown).

The flat tubes which have been cut to length can be placed together with corrugated fins to form the cooling core of the heat exchanger. The cooling core or the entire heat exchanger can be brazed in a brazing furnace. Here, the corrugated fins can be brazed to the flat tubes, and the flat tubes can be brazed to their inner inserts (not shown). It has been proven that the band thinning lines B disclosed herein also have a favorable effect on the brazing process.

Figure 17:
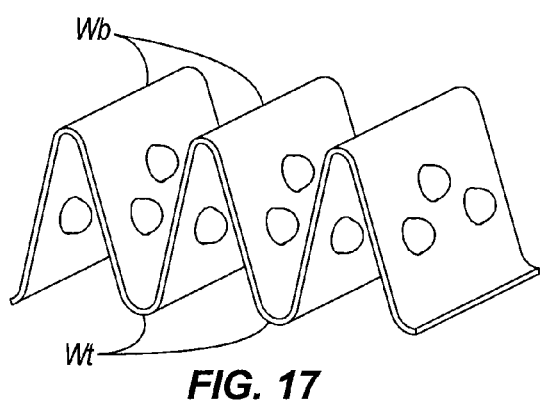
FIGS. 17 and 18 show strips with different corrugations according to different embodiments of the present invention.
Figure 18:
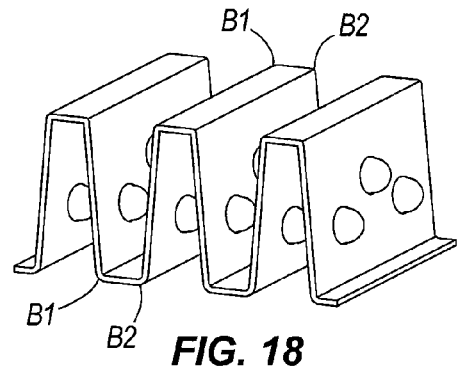

FIG. 17 shows a corrugated inner part with rounded corrugation peaks Wb and corrugation troughs Wt, whereas FIG. 18 shows an inner part c whose corrugation peaks and corrugation troughs are of substantially flat design. Both configurations can be provided according to the production method by means of a roller train. In the exemplary embodiment as per FIG. 18, it is also possible to provide, per corrugation peak Wb and corrugation trough Wt, two band thinning lines B1 and B2 in which in each case one bend line is then formed, so that the present proposal also encompasses such a configuration.

Figure 19:
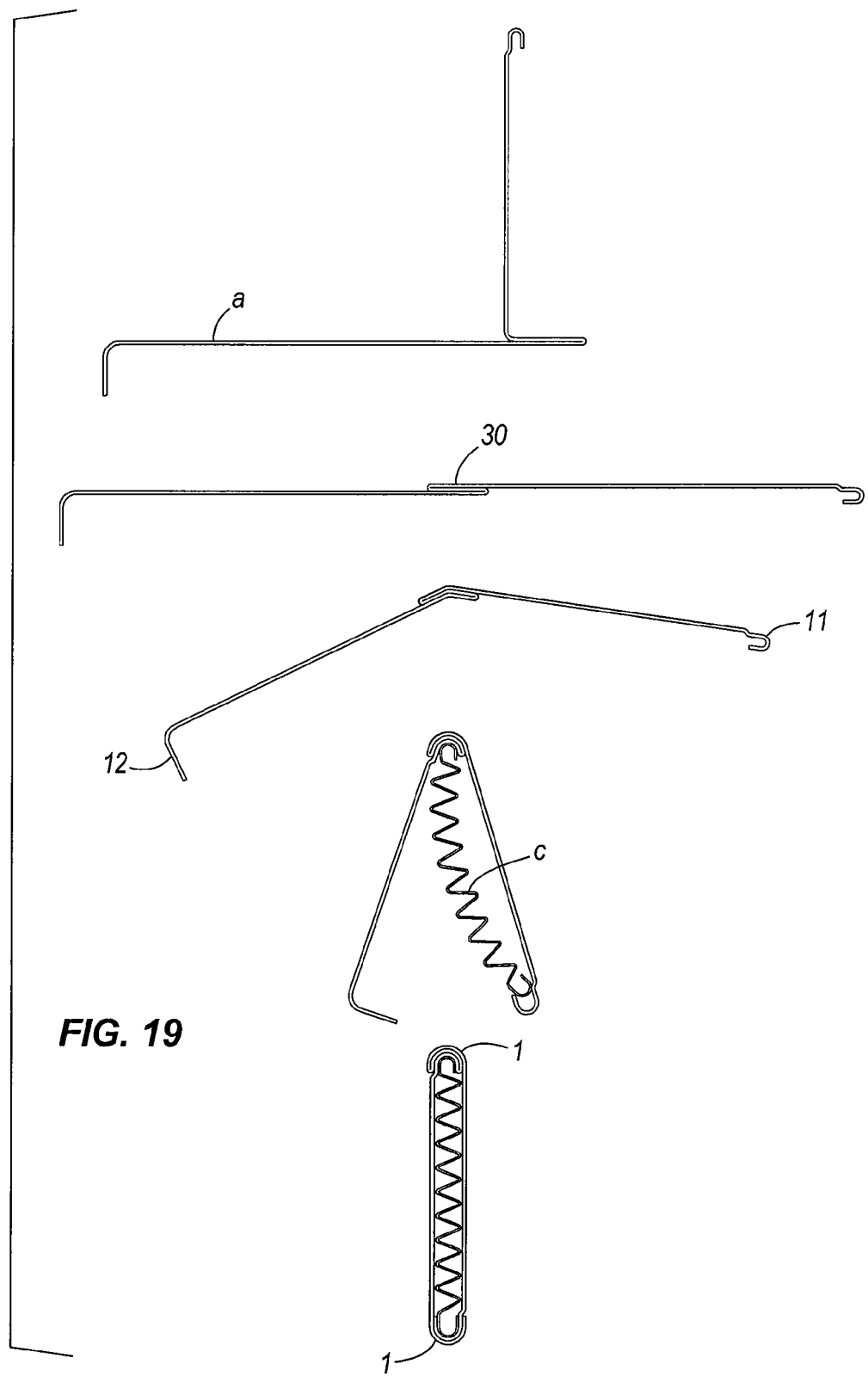
FIG. 19 shows a production process for another flat tube according to an embodiment of the present invention.

FIG. 19 illustrates the production of a flat tube in which only one single strip a is provided for forming the wall of the flat tube. The strip a encounters more shaping operations in comparison to the above-described exemplary embodiments. Here, a fold 30 which runs in a longitudinal direction of the strip a is formed, and a bend which is located in the fold 30 is then formed, which bend forms a narrow side 1 of the flat tube. In the flat tube, a second strip c forms the inner part, the latter being produced as described above. In FIG. 19, the upper three illustrations show intermediate stages of the shaping of the strip a. The fourth illustration shows the joining of the two shaped strips a and c, whereas the lower illustration shows the finished flat tube. The flat tube also has two reinforced narrow sides 1, and can therefore be formed with relatively low wall thicknesses.

Figure 20:
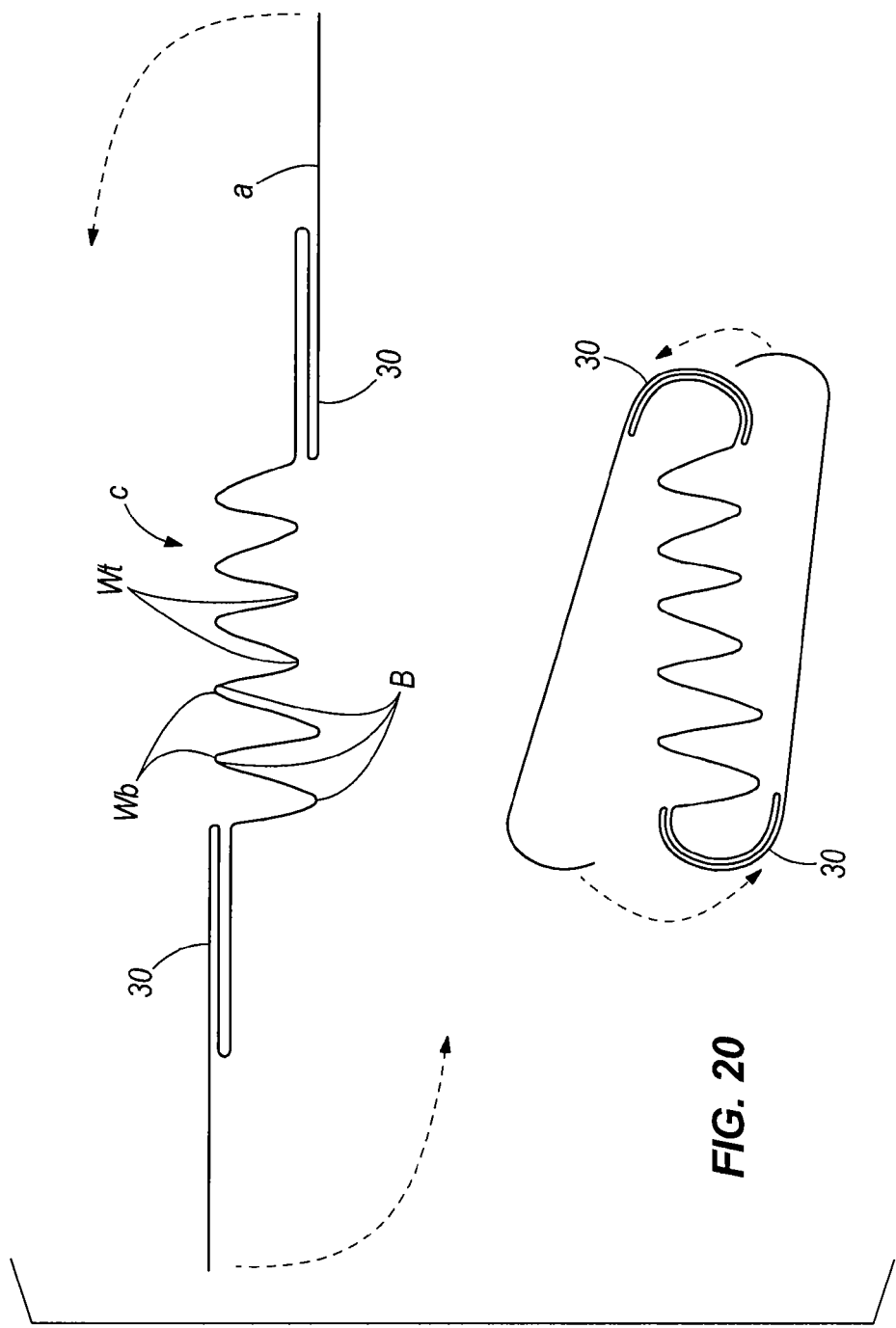
FIG. 20 shows a production process for yet another flat tube according to an embodiment of the present invention.

The two reinforced narrow sides also apply to the exemplary embodiment shown in FIG. 20, which shows intermediate stages of a flat tube being produced from a single strip. Two sections of the strip are shaped to form a wall part a, and another section of the strip constitutes an inner part c formed with corrugations. The corrugations can all have the same corrugation height (not shown), because the wall parts a can be arranged parallel to one another in this flat tube, too. On the roller train, the tube manufacturing process can begin with the production of the corrugated inner part c from a section of the strip, wherein firstly, as described above, band thinning lines B are embossed, followed by production of the corrugations. This can be followed by the formation of folds 30 belonging to the wall part a. The state now reached can be seen in the upper illustration of FIG. 20. This can be followed by the final closure of the tube, as is indicated by the dashed arrows in FIG. 20.

The invention claimed is:

1. A method of producing a flat tube, comprising:
    forming turbulators in a strip of material, each turbulator spaced from adjacent turbulators;
    passing the strip of material through rollers in a longitudinal direction of the strip;
    forming corrugations in the portion of the strip of material by passing the strip of material through the rollers, the corrugations including a plurality of alternating peaks and troughs, each of the plurality of alternating peaks and troughs extending in the longitudinal direction, wherein the turbulators are positioned between adjacent peaks and troughs of the plurality of alternating peaks and troughs;
    forming wall parts of the flat tube;
    positioning the portion of the strip of material between the wall parts of the flat tube;
    closing the wall parts of the flat tube around the strip of material; and
    cutting the strip in the transverse direction after the turbulators and the corrugations are formed.

2. The method of claim 1, wherein the wall parts and the portion are parts of a common strip of material.

3. The method of claim 1, wherein the wall parts and the portion are formed from separate strips of material.

4. The method of claim 1, wherein each of the wall parts and the portion are formed from separate strips of material.

5. The method of claim 1, wherein forming the turbulators comprises passing the portion of the strip of material through at least one roller pair in the longitudinal direction.

6. The method of claim 1, further comprising forming thinning lines in a longitudinal direction of a portion of a strip of material, each thinning line spaced from adjacent thinning lines.

7. A roller train for producing flat tubes from at least one strip of band material, the roller train comprising:
- a roller train having at least one roller pair positioned to produce spaced turbulators in the strip, the strip configured to move through the at least one roller pair in a longitudinal direction of the strip;
- a section for producing corrugations including a plurality of alternating peaks and troughs such that the peaks are located between the turbulators and each of the plurality of alternating peaks and troughs extend in the longitudinal direction of the strip;
- a section for shaping at least one longitudinal edge of at least one strip;
- a section for joining the at least one strip to form a tube within which the corrugations are located; and
- a separating station for separating tubes from upstream strip material, wherein the tubes are separated after the turbulators and the corrugations are formed.

8. The roller train of claim 7, further comprising a perforation station upstream of the separating station to perforate the at least one strip of material.

9. The roller train of claim 8, further comprising a section for aligning perforations in the at least one strip of material prior to separation.

10. The roller train of claim 7, further comprising a perforation station corresponding to each strip of band material.

11. The roller train of claim 7, further comprising at least one additional roller pair for forming the corrugations in the at least one strip.

12. The roller train of claim 7, wherein the section for producing corrugations includes at least one additional roller pair to form corrugation peaks, and at least one additional roller pair to form corrugation troughs.

13. The roller train of claim 7, further comprising an additional roller pair positioned to produce spaced thinning lines running in the longitudinal direction of the strip.

* * * * *